Nov. 17, 1925.

H. N. ATWOOD 1,561,764

PNEUMATIC VEHICLE WHEEL

Original Filed Aug. 23, 1923  2 Sheets-Sheet 2

Inventor

Harry N. Atwood.

By Lacy & Lacy, Attorneys

Patented Nov. 17, 1925.

1,561,764

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

PNEUMATIC VEHICLE WHEEL.

Application filed August 23, 1923, Serial No. 658,944. Renewed February 11, 1925.

*To all whom it may concern:*

Be it known that I, HARRY N. ATWOOD, a citizen of the United States, residing at Monson, in the county of Hampden and State of Massachusetts, have invented certain new and useful Improvements in Pneumatic Vehicle Wheels, of which the following is a specification.

This invention relates to improvements in vehicle wheels.

The term "wheel" as ordinarily employed in the art comprehends a structure built up of a number of elements assembled and held together in various ways. For example the wood spoke wheel or wood artillery wheel, as this type is commonly known, comprises an assemblage of solid wood spokes which radiate from a hub and which are held in their assembled relation by a felloe to which is adapted to be applied a metallic rim and to which rim is fitted a pneumatic tire casing, or a solid rubber tread is built up upon the rim. In another type, namely the wood disc wheel, the body of the wheel is made up of plies of wood facially bonded to each other, and the body is equipped with a hub and the other appurtenances required to complete the structure. In a similar type of wheel the body is of sheet metal. In rare instances more complicated structures have been suggested in which the body of the wheel may be made up of component parts stamped from metal and assembled in various ways. In all of these old structures, however, the wheel proper, or, as the term is applied in a more restricted sense, the body and felloe have been of rigid structure, dependence being placed solely on the pneumatic or solid rubber tread in an effort to obtain the required cushioning effect. It is a well known fact that a rigid wheel transmits shocks and vibrations to the bearings, axles, frame, and other component parts of the automotive vehicle in connection with which it is employed, and this notwithstanding the employment of a pneumatic or solid rubber tire or tread. Not only do wheels of the types above referred to present the disadvantage just noted, but they must of necessity be more or less cumbersome in construction and heavy in weight. As a consequence, when traveling at high speed, there are certain centrifugal and gyroscopic forces set up in the wheels which greatly interfere with steering of the vehicle and add to the danger attending fast driving. In consideration of the foregoing it is evident that an ideal wheel structure would be one light in weight and made up of such materials and so constructed as to possess, throughout, a greater or less degree of flexibility and resiliency within the limits required for stability under conditions of use. Therefore, it is the general object of the present invention to provide a wheel which will overcome all of the disadvantages presented by wheels of the old and common types briefly outlined above and which will furthermore present many advantageous characteristics not present in such previously employed types.

More specifically, it is another object of the invention to provide a wheel of composite structure and comprising, as a unit, a body, and structural parts constituting an integral part therewith and serving the equivalent purposes of the usual felloe, rim, and cushioning tread. In other words, the invention contemplates the provision of a wheel of composite structure in which the body and tread portions constitute an integrally connected whole, the body possessing the required rigidity and yet being resilient to a sufficient degree to prevent the transmission of shocks and vibrations to the axle and to the parts of the automotive vehicle to an appreciable extent, and the peripheral or tread portion of the structure being so constructed as to possess a greater degree of yieldability and resilience and thus perform all the functions of a pneumatic tire.

Figure 1:
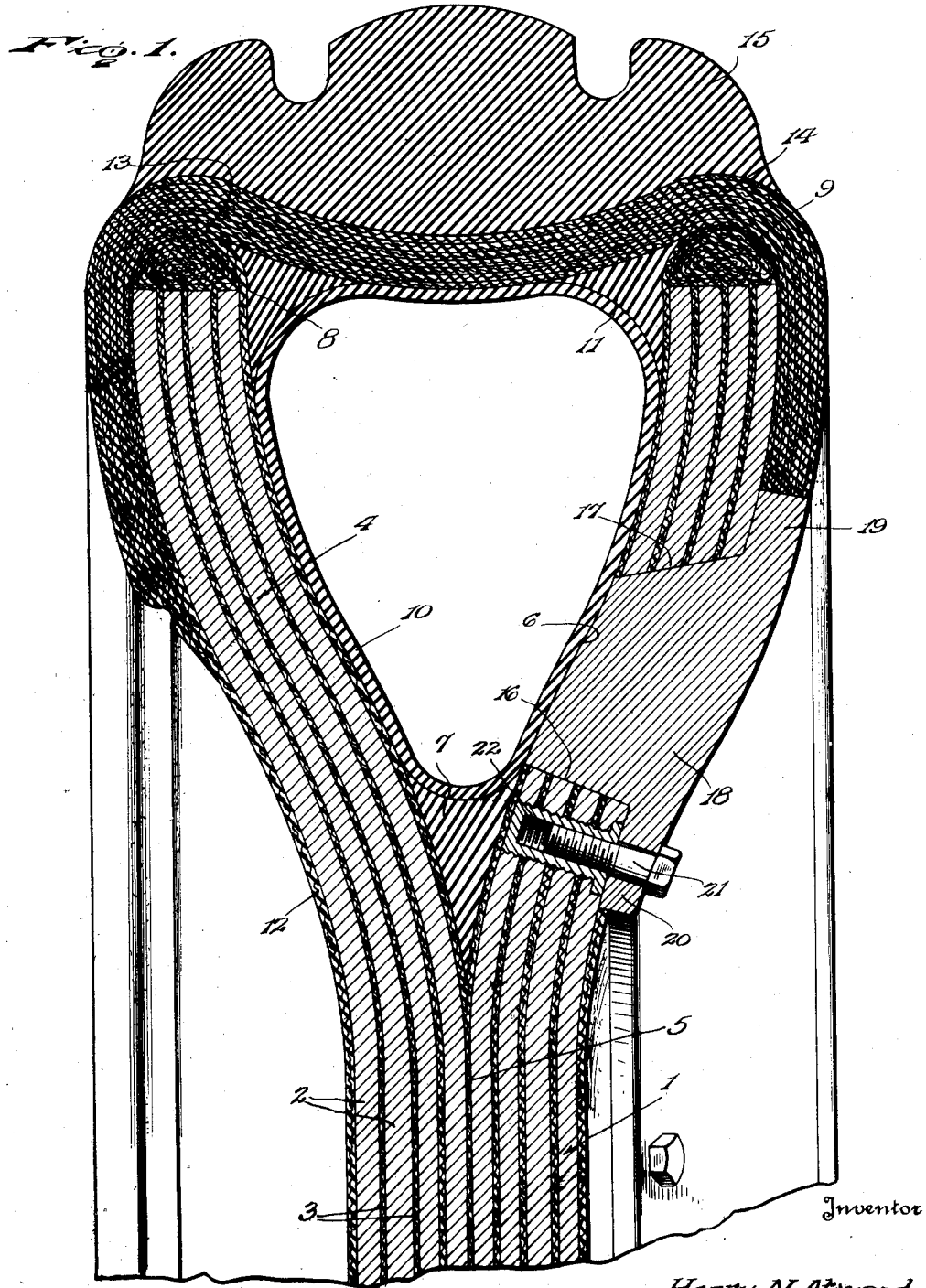
Figure 1 is a detail sectional view through a portion of an automotive vehicle wheel constructed in accordance with the present invention.

The wheel body is indicated in general by the numeral 1 and this body is made up of a plurality of veneer plies 2 and bonding plies 3 which are of rubber, rubberized fabric, or any similar suitable composition of materials. The body, and in fact the entire wheel, is built up in accordance with the method set forth in my co-pending application, filed August 23, 1923, Serial No. 658,945, and in preparing the body, a number of veneer plies are cut to circular form and are then arranged in two groups or sets each of which may embrace any desired number of the plies depending upon the thickness of the plies, the dimensions of the wheel, and other factors. The veneer plies of each group are alternated with the bonding plies 3, the rubber content of which is at this time in a substantially raw, uncured, or semi-cured state. The assemblage comprising each group is then subjected to heat and pressure in a suitable mold so that the rubber content of the bonding plies will be cured and at the same time caused to unite in an intimate manner with the faces of the veneer plies. Likewise in this operation, the assemblage comprising each group of plies is reduced to the required shape and in the illustrated embodiments of the invention, the intermediate or central portions of the plies comprising each assemblage are flat and their peripheral portions are dished, these dished peripheral portions being indicated in general by the numeral 4. In completing the body, the groups of plies in their molded and cured condition are disposed together so that their central portions will flatly contact, and they are united at these faces by a ply of rubberized fabric or the like corresponding to the plies 3 and indicated by the numeral 5. The peripheral portions of the assemblages being dished, a pneumatic cushioning chamber 6 is provided between their said portions. The two assemblages of veneer and bonding plies are, of course, so arranged that their peripheral portions will curve laterally outwardly in opposite directions away from each other so as to provide the pneumatic chamber 6. Adjacent the juncture of the peripheral portions of the assemblages with their respective central portions, the two assemblages are relatively gradually curved laterally in opposite directions away from each other so that a gradually inwardly narrowing annular space is provided between these portions of the assemblages and into this space there is packed a filling 7 of soft uncured, raw, or semi-cured rubber. This filling 7 is, of course, cured during a process of vulcanization of the entire wheel, and it becomes substantially an integral part with the innermost plies 3 of the two assemblages. In preparing each assemblage the peripheral portions of the plies 3 are initially left to project beyond the peripheries of the veneer plies or discs 2, and these projecting portions which are indicated by the numeral 8, are folded in in a convoluted or overlapped relation as shown in Figure 1 so as to provide transversely rounded peripheral cushioning shoulders 9 which, being of rubberized fabric are capable of withstanding wear and serve to prevent the peripheries of the discs or plies 2 cutting through the rubber tread of the wheel.

A pneumatic tube 10 is arranged within the pneumatic chamber 6 and may be inflated by any suitable inflating valve (not shown). Soft rubber is filled into the chamber 6 at the outer side of the tube 10 and between the lateral portions of the tube at its said outer side and the peripheral portions of the ply assemblages constituting the side walls of the said chamber 6, as indicated by the numeral 11.

By reference to Figure 1 it will be observed that not only are rubberized fabric plies 3 arranged between the veneer plies 2, but also a facing ply of this material, indicated by the numeral 12, is applied to the outer face of the outermost ply 2 of each ply assemblage and extends over said face, completely covering the same, and is brought over the respective shoulder 9 as indicated by the numeral 13 and over the inner face of the innermost one of the plies 2 of the respective assemblage.

A number of plies 14 of rubberized fabric or a similar composition of materials are arranged in superimposed relation and are applied circumferentially about the wheel body and vulcanized to the outer sides of the two ply assemblages at their dished peripheral portions, the intermediate portions of the plies 14 extending over and between the shoulders 9 and across the rubber fillings 11 and the outer side of the pneumatic tube 10.

The wheel further embodies a tread 15 which is formed by building up a mass of raw or semi-cured rubber about the assemblage of plies 14 and then curing and suitably shaping the mass to form the tread during the process of vulcanizing the wheel as a whole.

The pneumatic tube 10 may be permanently embodied in the structure of the wheel, or provision may be made for its removal, either as desired. In the latter case an annular opening 16 will preferably be formed in one wall of the pneumatic chamber 6, and the outer wall of this opening will preferably be beveled as indicated by the numeral 17. An annular closure member 18 is then fitted into the opening 16 and completely closes said opening, the said member 18 being provided with outer and inner circumferential flanges 19 and 20, and the closure member being secured in place by stud bolts 21 which are fitted through openings formed at intervals in the flange 20 and are threaded into bushings 22 seated in the wall of the pneumatic chamber in which the opening 16 is formed.

In view of the fact that the initially projecting peripheral portions of the binding plies 3 are folded or arranged in convoluted or overlapped relation to form the shoulders 9, there is no likelihood of the edges of the veneer plies 2 wearing through the ply assemblage 14 and tread 15.

Figure 2:
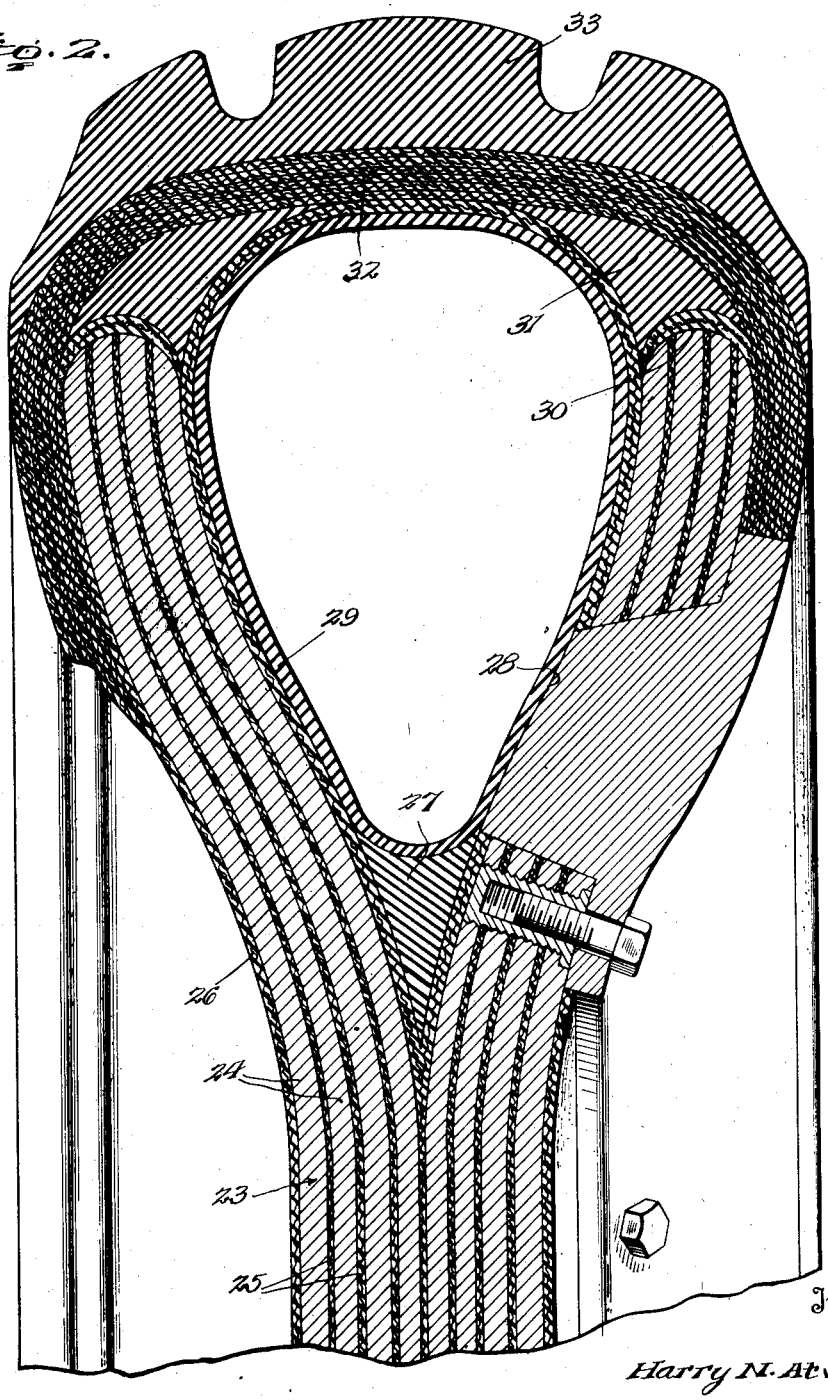
Figure 2 is a similar view illustrating a modification of the invention.

In the embodiment of the invention illustrated in Figure 2 of the drawings, the wheel body, indicated in general by the numeral 23, is made up of a plurality of veneer plies 24 and bonding plies 25 which correspond to the plies 2 and 3 of the first described form, these plies being arranged in two assemblages and each assemblage being provided with a facing ply 26 extending over the outer and inner faces of the assemblage as in the case of the plies 12. In this instance also a filling 27 of soft rubber corresponding to the filling 7 is applied in the space between the dished peripheral portions of the ply assemblages, these dished peripheral portions constituting the side walls of an annular pneumatic chamber 28 corresponding to the chamber 6 and housing a pneumatic tube 29 corresponding to the tube 10.

In this embodiment of the invention, instead of providing cushioned shoulders such as the shoulders 9 in the previously described form, the peripheries of the ply assemblages are transversely rounded as indicated by the numeral 30. Likewise, while in the previously described embodiment, shown in Figure 1, the outer side of the pneumatic tube 10 or, in other words, the side next to the tread is spaced inwardly from the shoulders 9, in the form shown in Figure 2 the inner tube extends at its said outer side somewhat beyond the rounded peripheries of the ply assemblages, and fillings 31 of soft rubber are applied about the rounded peripheries 30 of the ply assemblages and extend over the said peripheries and over the outer side of the tube 29. By rounding the peripheries of the ply assemblages and applying the fillings 21 of soft rubber thereover, the ply assemblages are prevented from cutting through the tread of the tire with the same degree of effectiveness as by the employment of the cushioning shoulders 9.

An assemblage of rubberized fabric plies 32 is arranged over the rubber fillings 31 and the peripheral portions of the ply assemblages 23, and a tread 33, corresponding to the tread 15, is formed over the said assemblage of plies 32.

From the foregoing description of the invention it will be evident that in both embodiments and in various other embodiments which might be made within the terms of the appended claims, the wheel comprises a cushioning body which is flexible, resilient, and yieldable, to a desirable degree, adapting it to absorb shocks, impacts, and vibrations and prevent their transmission with undiminished force to the axle and other parts of the vehicle running gear, the body being provided with a pneumatic chamber forming an integral part therewith and having a pneumatic cushioning medium therein by which the tread of the wheel, which likewise constitutes an integral part of the structure, is yieldably supported. It will also be evident that the tread of the wheel is supported in part by the walls of the pneumatic chamber or, in other words, by the dished peripheral portions of the ply assemblages 1 and 23, and in part by the pneumatic tubes 10 and 29. Furthermore, it will be evident that because of the character of the materials of which the ply assemblages 1 and 23 are made, their dished peripheral portions or, in other words, the walls of the pneumatic chamber 6 and 28, will be more or less resilient and yieldable, with the consequence that the resilient and cushioning qualities of the wheel structure are materially improved.

It will also be evident that while the body of the wheel possesses the required degree of stability, the wheel constitutes in effect an integral structure throughout and is of increasing degree of resiliency and yieldability in the direction of its periphery. Also it will be understood that in the wheel embodying the invention all of the component parts are substantially integrally united, and the employment of metal rims and separate cushioning devices such as tire casings is entirely obviated.

As regards the closure member 18, it will be evident that in a wheel constructed as shown in the drawings and embodying such a member, the inner tube may be removed, repaired, and replaced without the necessity of jacking up the wheel.

In the manufacture of the wheel it is preferable to employ the materials referred to herein, namely, veneer, rubberized fabric, and soft rubber, but it will be understood that there are probably other materials which might equally well be employed as substitutes for those named and that for this reason the invention is not especially limited to the use of such materials.

An advantage presented by the wheel structure embodying the invention and which is not present in other pneumatically cushioned wheels, resides in the fact that the tread body 15, in the form of the invention shown in Figure 1 of the drawings for example, is sustained by the foundation 14 which is united at its lateral portions to the side walls 4 of the chamber 6, the resiliency of these side walls serving to yieldably support the foundation 14 in such a manner that through inward flexing of the said side walls, the foundation may sag to a limited extent at its intermediate portion thus affording a yieldable resilient backing for the tread body 15, in consequence of which the wheel may be employed without likelihood of damage and without any inconvenience being experienced, in the event the inner tube 10 becomes deflated through puncture or otherwise.

Having thus described the invention, what is claimed as new is:

1. In a vehicle wheel, a body having a peripheral chamber, a pneuamtic cushioning element within the chamber, and a tread constituting the outer peripheral wall of the chamber and yieldably sustained by the said cushioning element.

2. In a vehicle wheel, a body having a peripheral chamber defined by resilient side walls, a pneumatic cushioning element within the chamber, and a tread constituting the outer peripheral wall of the chamber and yieldably and resiliently sustained by the side walls and by the said cushioning element.

3. In a vehicle wheel, a body having a peripheral pneumatic chamber, and a yieldably sustained tread constituting the outer peripheral wall of the chamber and yieldably sustained.

4. In a vehicle wheel, a body having a peripheral pneumatic chamber defined by resilient side walls, and an outer peripheral wall constituting a tread resiliently supported by said walls of the chamber.

5. In a vehicle wheel, a body having a peripheral pneumatic chamber defined by resilient side walls and an outer peripheral wall constituting a tread resiliently supported by said side walls, and a pneumatic cushioning element within the chamber yieldably sustaining the intermediate portion of the tread.

6. In a vehicle wheel, a body having a peripheral, resilient-walled chamber, a pneumatic cushioning element within the chamber, and a tread constituting the outer peripheral wall of the chamber and supported upon and between the peripheries of the first mentioned walls and having its intermediate portion yieldably sustained by the pneumatic cushioning element.

7. In a vehicle wheel, a composite, integrally bonded structure comprising a resilent body, a chamber peripherally surrounding the body and defined by walls forming an integral part with the said body, and a tread integrally bonded with the said walls of the chamber and circumferentially surrounding the same and constituting the outer peripheral wall of the chamber and resiliently supported by the first mentioned walls.

8. In a vehicle wheel, a composite, integrally bonded, unitary structure comprising a body, a peripheral pneumatic chamber, and a tread constituting the outer wall of the chamber and circumferentially surrounding the chamber.

9. In a vehicle wheel, a body comprising composite laminated sections of substantially circular form and each comprising a plurality of resilient body plies and intervening bonding plies, the mid portions of the sections being united and the peripheral portions thereof being outwardly turned to define the walls of a peripheral chamber surrounding the body, and a tread constituting the outer peripheral wall of the chamber and sustained by its first mentioned walls.

10. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, and a tread constituting the outer peripheral wall of the chamber and comprising a foundation of rubberized fibrous material extending between and sustained by the said side walls, and a body of cushioning material sustained by the foundation.

11. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, and a tread constituting the outer peripheral wall of the chamber and comprising a foundation of rubberized fibrous material extending between and sustained by the walls, and a body of cushioning material sustained by the foundation, the foundation extending over the peripheries of the side walls and being integrally united with the outer sides of the said walls.

12. In a vehicle wheel, a body comprising composite laminated sections of substantially circular form and each comprising a plurality of resilient body plies and intervening bonding plies, the mid portions of the sections being united and the perihperal portions thereof being outwardly turned to define the side walls of a peripheral chamber surrounding the body, a tread constituting the outer wall of the chamber and sustained by said wall, and a pneumatic cushioning element within the chamber.

13. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, a tread constituting the outer peripheral wall of the chamber and comprising a foundation of rubberized fibrous material extending between and sustained by the side walls, and a body of cushioning material sustained by the foundation, and a pneumatic cushioning element within the chamber sustaining the intermediate portion of the foundation.

14. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, the bonding plies of the body sections being extended peripherally beyond the body plies of said sections and having their extended portions interlaid to provide protecting and cushioning shoulders at the peripheries of said body sections, and a tread constituting the outer peripheral wall of the chamber and sustained by said side walls and extending over the said shoulders thereof.

15. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, the bonding plies of the body sections being extended peripherally beyond the body plies of said sections and having their extended portions interlaid to provide protecting and cushioning shoulders at the peripheries of said body sections, a tread constituting the outer peripheral wall of the chamber and sustained by said side walls and extending over the said shoulders thereof, and a pneumatic cushioning element within the chamber yieldably sustaining the intermediate portion of the tread.

16. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, the said bonding plies of the sections being peripherally extended beyond the body plies thereof and interlaid to provide cushioning and protecting shoulders at the peripheries of the respective body sections, and a tread constituting the outer peripheral wall of the chamber and comprising a foundation of rubberized fabric material united to the said side walls of the chamber and extending at its lateral portions over the said shoulders and sustained thereon, and a tread surface supported upon and extending about the outer side of the foundation.

17. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, the said bonding plies of the sections being peripherally extended beyond the body plies thereof and interlaid to provide cushioning and protecting shoulders at the peripheries of the respective body sections, a tread constituting the outer peripheral wall of the chamber and comprising a foundation of rubberized fabric material united to the said side walls of the chamber and extending at its lateral portions over the said shoulders and sustained thereon, and a tread surface supported upon and extending about the outer side of the foundation, and a pneumatic cushioning element within the said chamber.

18. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, the said bonding plies of the sections being peripherally extended beyond the body plies thereof and interlaid to provide cushioning and protecting shoulders at the peripheries of the respective body sections, a tread constituting the outer peripheral wall of the chamber and comprising a foundation of rubberized fabric material united to the said side walls of the chamber and extending at its lateral portions over the said shoulders and sustained thereon, a tread surface supported upon and extending about the outer side of the foundation, and a pneumatic cushioning element within the said chamber, and a filling of soft rubber between the outwardly turned peripheral portions of the body sections defining the inner wall of said chamber.

19. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, the said bonding plies of the sections being peripherally extended beyond the body plies thereof and interlaid to provide cushioning and protecting shoulders at the peripheries of the respective body sections, a tread constituting the outer peripheral wall of the chamber and comprising a foundation of rubberized fabric material united to the said side walls of the chamber and extending at its lateral portions over the said shoulders and sustained thereon, a tread surface supported upon and extending about the outer side of the foundation, and a pneumatic cushioning element within the said chamber, a filling of soft rubber between the outwardly turned peripheral portions of the body sections defining the inner wall of said chamber, and other fillings of soft rubber in the angle between the peripheral portions of the side walls and the inner side of the tread foundation.

20. In a vehicle wheel, a body having a peripheral chamber, a tread constituting the outer wall of the chamber, a pneumatic cushioning element within the chamber yieldably sustaining the tread, one side wall of the chamber having a continuous annular opening through which the said element may be removed and replaced, and means for closing said opening.

21. In a vehicle wheel, a body having a peripheral chamber, a tread constituting the outer wall of the chamber, a pneumatic cushioning element within the chamber yieldably sustaining the tread, one side wall of the chamber having a continuous annular opening through which the said element may be removed and replaced, and means for closing said opening, the said means comprising an annular closure removably fitted into the opening, and means removably securing the closure to the said side wall of the chamber.

22. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, the bonding plies projecting peripherally beyond the body plies of the sections and having their projecting portions interlaid to provide a protecting and cushioning padding, a ply of rubberized fabric covering the outer face of each of said body sections and having a portion extended over the interlaid portions of the bonding plies of the sections whereby to define transversely rounded shoulders at the peripheries of said body sections, and a tread constituting the outer wall of the chamber and comprising a foundation of substantially non-stretching material united to the outer sides of the side walls and extending over the said shoulders, and a tread body of cushioning material supported upon the outer side of the foundation and surrounding the same.

23. In a vehicle wheel, a body comprising composite laminated sections of substantially circular form and each comprising a plurality of resilient body plies and intervening bonding plies, the mid portions of the sections being united and the peripheral portions thereof being outwardly turned to define the side walls of a peripheral chamber surrounding the body, the bonding plies projecting peripherally beyond the body plies of the sections and having their projecting portions interlaid to provide a protecting and cushioning padding, a ply of rubberized fabric covering the outer face of each of said body sections and having a portion extended over the interlaid portions of the bonding plies of the sections whereby to define transversely rounded shoulders at the peripheries of said body sections, a tread constituting the outer peripheral wall of the chamber and comprising a foundation of substantially non-stretching material united to the outer sides of the walls and extending over the said shoulders, and a tread body of cushioning material supported upon the outer side of the foundation and surrounding the same, and a pneumatic cushioning element within the chamber sustaining the intermediate portion of the foundation.

In testimony whereof I affix my signature.

HARRY N. ATWOOD.